(12) United States Patent
Urban

(10) Patent No.: US 9,281,892 B2
(45) Date of Patent: Mar. 8, 2016

(54) OTDR TRACE ANALYSIS IN PON SYSTEMS

(75) Inventor: Patryk Urban, Vallingby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 83 days.

(21) Appl. No.: 14/128,740

(22) PCT Filed: Jun. 30, 2011

(86) PCT No.: PCT/SE2011/050880
§ 371 (c)(1),
(2), (4) Date: Dec. 23, 2013

(87) PCT Pub. No.: WO2013/002692
PCT Pub. Date: Jan. 3, 2013

(65) Prior Publication Data
US 2014/0126900 A1    May 8, 2014

(51) Int. Cl.
*H04B 10/08* (2006.01)
*H04B 10/071* (2013.01)
*G01M 11/00* (2006.01)
(Continued)

(52) U.S. Cl.
CPC .......... *H04B 10/071* (2013.01); *G01M 11/3136* (2013.01); *G01M 11/3145* (2013.01); *H04B 10/0771* (2013.01); *H04B 10/27* (2013.01)

(58) Field of Classification Search
CPC ... H04B 10/071; H04B 10/0771; H04B 10/27
See application file for complete search history.

(56) References Cited

U.S. PATENT DOCUMENTS

| | | | |
|---|---|---|---|
| 6,396,573 | B1 | 5/2002 | Pimpinella |
| 6,396,575 | B1 | 5/2002 | Holland |
| 6,534,997 | B1 | 3/2003 | Horishita et al. |

(Continued)

FOREIGN PATENT DOCUMENTS

| | | |
|---|---|---|
| EP | 1578038 A1 | 9/2005 |
| EP | 1 986 350 A1 | 10/2008 |

(Continued)

OTHER PUBLICATIONS

ITU-T Recommendation G.984.2, Amendment 2, Mar. 2008, all pages.

(Continued)

*Primary Examiner* — Dzung Tran
(74) *Attorney, Agent, or Firm* — Leffler Intellectual Property Law, PLLC

(57) ABSTRACT

Fault analysis of a Passive Optical Network comprising Optical Network Terminal(s) uses Optical Time Domain Reflectometry (OTDR). An OTDR measurement signal is supplied to a multistage splitter having a ratio $2:N_{root}$. At least one drop link which is connected to the multistage splitter comprises one or more sub-splitters which having a ratio $1:N_{branch}$. A new event location is determined based on the OTDR measurement signal by analyzing OTDR measurement data relating to the sub-splitter based on distance from the multistage splitter and to the sub-splitter. A fault magnitude is calculated for a given location by subtracting an event magnitude obtained from the new OTDR measurement from a reference OTDR measurement and taking into account the number of drop links connected to the last splitter stage and to the sub-splitter in the reference measurement and the new measurement, thereby enabling determination of position and severity of the fault locations.

28 Claims, 7 Drawing Sheets

(51) Int. Cl.
*H04B 10/077* (2013.01)
*H04B 10/27* (2013.01)

(56) References Cited

U.S. PATENT DOCUMENTS

| | | | |
|---|---|---|---|
| 7,684,702 B2 | 3/2010 | Lu | |
| 8,411,259 B2* | 4/2013 | Levin et al. | 356/73.1 |
| 8,724,102 B2* | 5/2014 | Urban | 356/73.1 |
| 9,042,723 B2* | 5/2015 | Dahlfort | 398/21 |
| 2006/0029390 A1 | 2/2006 | Schmuck et al. | |
| 2006/0110161 A1 | 5/2006 | Cho et al. | |
| 2008/0031624 A1* | 2/2008 | Smith et al. | 398/71 |
| 2008/0062408 A1 | 3/2008 | Lai et al. | |
| 2008/0123085 A1 | 5/2008 | Sikora et al. | |
| 2009/0190921 A1 | 7/2009 | Nakajima et al. | |
| 2011/0141457 A1 | 6/2011 | Levin et al. | |
| 2011/0268438 A1* | 11/2011 | Daems | 398/16 |
| 2011/0311220 A1* | 12/2011 | Nakajima et al. | 398/20 |
| 2012/0039598 A1 | 2/2012 | Dahlfort | |

FOREIGN PATENT DOCUMENTS

| | | |
|---|---|---|
| EP | 1 986 351 A1 | 10/2008 |
| JP | 2008232849 A | 10/2008 |
| WO | 2008116309 A1 | 10/2008 |
| WO | 2010041897 A2 | 4/2010 |
| WO | 20100076567 A1 | 7/2010 |
| WO | 2010/126427 A1 | 11/2010 |
| WO | 2011007298 A1 | 1/2011 |
| WO | 2011/086400 A1 | 7/2011 |
| WO | 2012/087205 A1 | 6/2012 |

OTHER PUBLICATIONS

ITU-T Recommendation L.66, May 2007, all pages.
PCT International Search Report, mailed Mar. 23, 2012, in connection with International Application No. PCT/SE2011/050880, all pages.
Urban, P. et al. "OTM- and OTDR-based cost-efficient fiber fault identification and localization in Passive Optical Network" Optical Fiber Communication Conference, 2011. Technical Digest. OFC/NFOEC, pp. 1-3, Mar. 6, 2011; whole document.
Yuksel, K. et al. "Optical layer monitoring in Passive Optical Networks (PONs); A review" Transparent Optical Networks, 2008, ICTON 2008. 10th Anniversary International Conference on; Jun. 22, 2008 IEEE, Piscataway, NJ, USA, pp. 92-98; whole document.
ITU-T Recommendation L.25 "Optical fibre cable network maintenance", Oct. 1996, all pages.
ITU-T Recommendation L.40 "Optical fibre outside plant maintenance support, monitoring and testing system", Oct. 2000, all pages.
ITU-T Recommendation L.42 "Extending optical fibre solutions into the access network", May 2003, all pages.
ITU-T Recommendation L.53 "Optical fibre maintenance criteria for access networks", May 2003, all pages.
Chinese Office Action, issued Sep. 11, 2015, for Chinese Application No. 201180072031.2, all pages.
English translation of Chinese Office Action, issued Sep. 11, 2015, for Chinese Application No. 201180072031.2, all pages.
English translation of Chinese Search Report dated Aug. 28, 2015, in connection with Chinese Application No. 201180072031.2, all pages.

* cited by examiner $$\begin{array}{|c|c|c|c|} \hline \alpha_{1,1} & \alpha_{1,2} & \cdots & \alpha_{1,J} \\ \hline \alpha_{2,1} & \alpha_{2,2} & \cdots & \alpha_{2,J} \\ \hline \alpha_{3,1} & \alpha_{3,2} & \cdots & \alpha_{3,J} \\ \hline \cdots & \cdots & \cdots & \cdots \\ \hline \alpha_{N,1} & \alpha_{N,2} & \cdots & \alpha_{N,J} \\ \hline \end{array}$$
Fig. 9
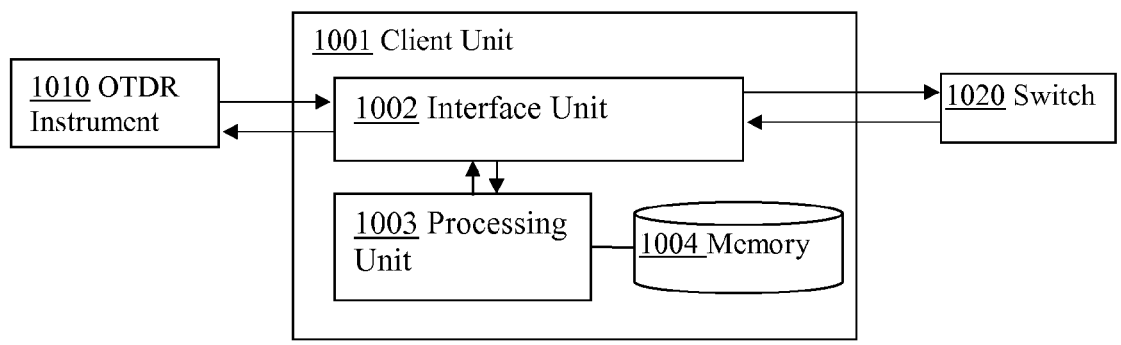
Fig. 10
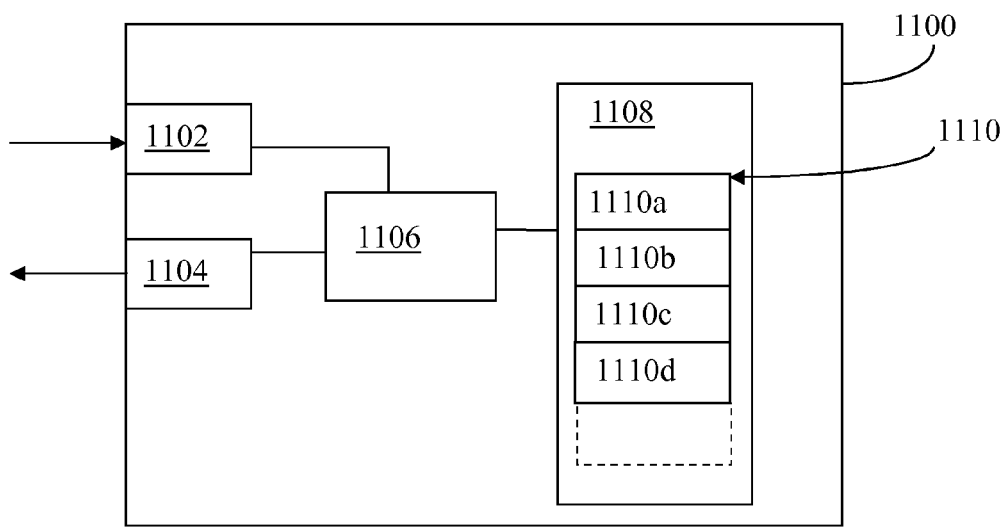
Fig. 11

OTDR TRACE ANALYSIS IN PON SYSTEMS

TECHNICAL FIELD

The invention relates generally to arrangements, methods and systems for performing fault analysis in a Passive Optical Network, PON. The present invention relates in particular to an arrangement and method for performing fault analysis in PON arrangement comprising sub-splitters.

BACKGROUND

A Passive Optical Network, PON is a point-to-multipoint network architecture employing fibre cables from a Central Office, CO, to premises. It employs unpowered optical splitters to enable a single optical fibre to serve multiple premises. A PON comprises an Optical Line Terminal, OLT, at the CO of the service provider. It comprises a number of Optical Network Terminals, ONTs, near end users. A PON configuration reduces the amount of fiber and CO equipment required compared with point-to-point architectures. A PON is a form of fiber-optic access network.

In order to supervise and monitor the performance of a PON, Optical Time-Domain Reflectometry, OTDR, may be used. The supervision and monitoring of PONS using OTDR is further described in the recommendations L-25, L-40, L-42 and L-53 from the Telecommunication Standardization Sector of International Telecommunication Union (ITU-T). Briefly described, an OTDR device injects a series of optical pulses into the fiber. The series of optical pulses, also called OTDR signal(s) travel down the network towards the ONTs. Parts of the OTDR signals are reflected back towards the OTDR device. The back reflected, or backscattered, OTDR signal may be used for estimating the fiber's length and overall attenuation, including losses such as splitter losses. The backscattered OTDR signal may also be used to locate faults, such as breaks, and to measure optical return loss.

However, the amount of light scattered back to the OTDR for measurement is quite small, about one-millionth of the optical power in the test pulse. Since so little of the light comes back to the OTDR for analysis, the OTDR receiver circuit must be very sensitive. That means that big reflections, which may be one percent of the outgoing signal, will saturate the receiver, or overload it.

Another difficulty with OTDR measurements is that backscattered light from the fibers between a splitter and the ONTs will be summarized passing back through the splitter and again attenuated, making it very difficult to obtain the magnitude of a possible fault in one or more fibres between the splitter and the ONTs.

In order to customize and adapt the layout of a PON to the end-users' needs, more advanced architectures are now emerging. For example, tree architectures, may be achieved by adding sub-splitters to the drop links. Normally, the sub-splitter divides a drop link into a tree comprising two or more of drop links branches, i.e. drop links form the sub-splitter to the ONT. Thereby, more drop links may be added. However, adding a sub-splitter may make it even more difficult to obtain the location and magnitude of a fault in the PON.

As a consequence of the difficulties described above, misinterpretations may arise when reading or analyzing the backscattered OTDR signal, also referred to as the trace, after the splitter or the sub-splitters. Even if a fault is detected after the splitter, i.e. between the splitter and the ONTs, it is impossible to define which drop link or sub-splitter, i.e. which fiber between the splitter and the sub-splitter/ONTs, is affected as the received backscattered signal is a superposition of power coming back to the splitter from all of the drop links.

SUMMARY

It is an object of the invention to address at least some of the limitations, problems and issues outlined above. It is also an object to improve the process of performing fault analysis in Passive Optical Networks, PON. It is possible to achieve these objects and others by using a method and an arrangement as defined in the attached independent claims.

According to a first aspect, a procedure of performing fault analysis, performed by an arrangement in a PON, is provided. The PON comprises at least one Optical Network Terminal, ONT, and the fault analysis is performed by using Optical Time Domain Reflectometry, OTDR. A new OTDR measurement is triggered and the result from the OTDR measurement will later be compared to a reference measurement which has previously been made to indicate the original state of the PON. By the PON comprising an ONT is meant that an ONT is connected to the PON. The OTDR measurement signal is inserted into a multistage splitter before a last splitter stage of the multistage splitter. The last splitter stage is of ratio $2:N_{root}$, and at least one of the drop link(s) being connected to the multistage splitter also comprises at least one sub-splitter having a splitter ratio $1:N_{branch}$.

One or more new event location(s) are determined based on the OTDR measurement signal by analyzing the OTDR measurement data relating to the sub-splitter connected to the last splitter stage in a predefined sequence. The fault magnitude is, for a given location, calculated by subtracting an event magnitude obtained from the new OTDR measurement from the reference OTDR measurement and taking into account the number of drop links connected to the last splitter stage and/or the sub-splitter and thereby enabling determination of position and severity of the fault location.

According to another aspect, a client unit adapted to perform fault analysis in a PON by using OTDR is provided. The client unit comprises an interface unit and processing unit. The processing unit is adapted to trigger a new OTDR measurement. A previous reference measurement has been made indicating an original state of the PON. The processing unit is further adapted to insert an OTDR measurement signal, via the interface unit, into a multistage splitter before a last splitter stage of the multistage splitter. The last splitter stage is of a ratio $2:N_{root}$. One or more drop link(s) is connected to the multistage splitter. The drop link(s) comprises one or more sub-splitter(s) having a ratio which is $1:N_{branch}$.

The processing unit is further adapted to determine one or more new event location(s) based on the OTDR measurement signal by analyzing OTDR measurement data relating to the sub-splitter(s) connected to the last splitter stage in a stage in a predefined sequence. The processing unit is further adapted to calculate a fault magnitude for a given location by subtracting an event magnitude obtained from the new OTDR measurement from the reference OTDR measurement and taking into account the number of drop links connected to the last splitter stage and to the at least one sub-splitter in the reference measurement and the new measurement, thereby enabling determination of position and severity of the fault locations.

The above method and arrangement may enable improved optical network supervision and fault analysis in PON architectures comprising sub-splitters. The method and arrangement may also contribute to a cost-efficient solution due to a high sharing factor, i.e. a large number of ONTs may be served by one fault localization. The method and arrangement may also provide a solution having a high accuracy and fault detection sensitivity.

The above method and arrangement may be configured and implemented according to different embodiments. In one example embodiment, the OTDR measurement data relates to a fibre link arranged to connect a first sub-splitter to one of: an ONT or a second sub-splitter.

According to one example embodiment, a predefined sequence is based on the number of serially connected sub-splitters between an ONT and the last splitters stage.

According to another example embodiment, the predefined sequence may be determined to start by analyzing OTDR measurement data relating to a sub-splitter having drop links being connected to ONTs only.

According to another example embodiment, the ONTs being connected to the PON is periodically queried about their received optical power.

According to another example embodiment, the ONTs being connected to the PON is queried about their received optical power on-demand.

According to another example embodiment, a total loss, TLref, is represented in the reference OTDR measurement by $$TLref = 5*\log\left(\frac{N^2}{\sum_{n=1}^{N}\Pi_{j=1}^{J}\alpha REF_{n,j}^2 - M_{REF}}\right),$$

where N is the number of drop links of the last splitter stage of the multistage splitter, $N_{root}$, or where N is the number of drop links of a sub-splitter, $N_{branch}$, J is the number of events and M is either the number of non-connected drop links of the last splitter stage of the multistage splitter, or the number of non-connected drop links of the sub-splitter.

According to one example embodiment, a total loss, TLnew, in the new OTDR measurement is represented by $$TLnew = 5*\log\left(\frac{N^2}{\sum_{n=1}^{N}\Pi_{j=1}^{J}\alpha NEW_{n,j}^2 - M_{NEW}}\right),$$

where N is the number of drop links of the last splitter stage of the multistage splitter, $N_{root}$, or where N is the number of drop links of a sub-splitter, $N_{branch}$, J is the number of events and M is either the number of non-connected drop links of the last splitter stage of the multistage splitter, or the number of non-connected drop links of the sub-splitter.

According to another example embodiment, difference, $\Delta TL$, between the total loss in the reference OTDR measurement and the total loss in the new OTDR measurement, $\Delta TL$, is represented by $$\Delta TL = \left|5*\log\left(\frac{\sum_{n=1}^{N}\Pi_{j=1}^{J}\alpha NEW_{n,j}^2 - M_{NEW}}{\sum_{n=1}^{N}\Pi_{j=1}^{J}\alpha REF_{n,j}^2 - M_{REF}}\right)\right|.$$

According to another possible example embodiment, an alarm is received from one ONT and the number of new event locations is one and no events were detected in the reference measurement, wherein all the branches were connected to the splitter in the OTDR reference measurement and are connected in the new OTDR measurement, wherein the processing unit is adapted to calculate the magnitude of the fault, $\alpha$, using $$\alpha[dB] = 5*\log\left(1 - N + N*10^{\frac{-|\Delta TL|}{5}}\right).$$

According to one example embodiment, an alarm is received from one ONT and the number of new event locations is j, j>1, and no events were detected in the reference measurement, the magnitude of the fault in the first ONT, $\alpha$, is calculated using, $\alpha_j[dB]=5*\log(1-N+N*10^{-|\Delta TL_j|})$.

According to another example embodiment, an alarm is received from n number of ONTs, n>1, and the number of new event locations is one and no events were detected in the reference measurement, wherein the processing unit is adapted to calculate the magnitude of the fault in the first ONT, $\alpha$, using $$\alpha[dB] = 5*\log\left(N*10^{\frac{-|\Delta TL|}{5}} - \sum_{m=2}^{N}\alpha_n^2\right).$$

According to one example embodiment, a is calculated for a first sub-splitter having a splitter ratio 1:N, at least one second sub-splitter is connected to the branch of the first sub-splitter, and wherein a first matrix correspond to the first sub-splitter is calculated having $\alpha_{n,j}$ where j is a location and n an branch of the first sub-splitter, and wherein the location for the second sub-splitter is replaced with an $\alpha$ which is calculated in a second matrix corresponding to the branches of the second sub-splitter.

According to one example embodiment, a computer program comprising computer readable means, which when run in one or more processing units, causes a client unit to perform the actions of the method embodiment described above.

BRIEF DESCRIPTION OF DRAWINGS

The invention will now be described in more detail by means of exemplary embodiments and with reference to the accompanying drawings, in which:

FIG. 9 is an event matrix, according to one example embodiment.

FIG. 10 is an arrangement of a fibre plant manager comprising a client unit adapted to determine the location and severity of a fault, according to one example embodiment.

FIG. 11 is an arrangement for determining the location and severity of a fault in a PON, according to one example embodiment.

DETAILED DESCRIPTION

Figure 1A:
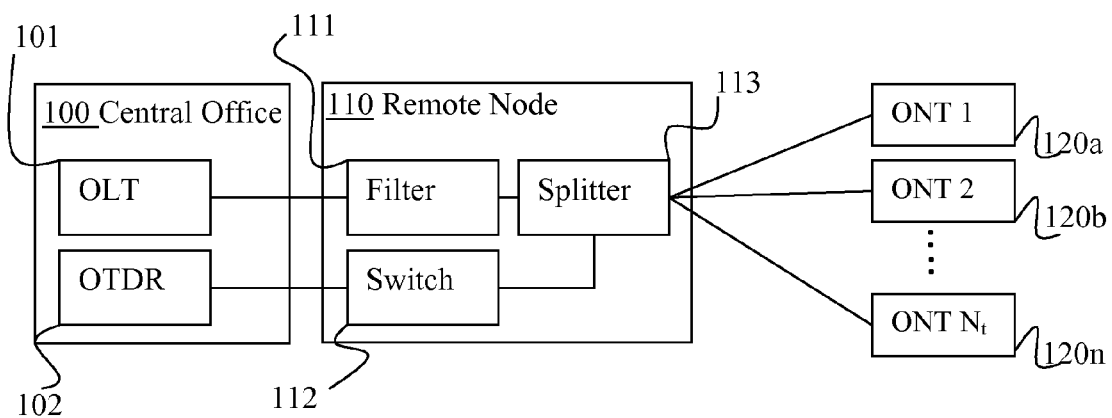
FIG. 1a is a schematic illustration of a PON, according to one example embodiment.

Briefly described, a method and a client unit are provided for monitoring and supervising a passive optical network. The monitoring and supervising of the PON comprises analyzing a new detected event in at least one of the fibres between a splitter in the remote node, a sub-splitter connected to the splitter and the ONTs, also called the drop links.

With reference to FIG. 1, a schematic illustration of a simple PON architecture is described. FIG. 1 is a block diagram illustrating the PON comprising a central office 100 having an Optical Line Termination, OLT, 101 and an OTDR device 102. The PON also comprises a remote node 110 having a filter 111, a switch 112 and a splitter 113. The OLT 101 is connected to the splitter 113 via the filter 111. The OTDR device 102 is connected to the switch 112, which in turn is adapted to insert an OTDR signal from the OTDR device 102 into the splitter 113. The splitter 113 is, in an exemplifying embodiment, a multistage splitter. In the embodiment illustrated in FIG. 1, the splitter is a two stage splitter comprising a first splitter stage of 1:N1 and a second splitter stage of 2:N2 thereby having a total number of branches, NT, which is N1*N2. In FIG. 1, the number of ONTs 120a-n is N1*N2. The fibres from the splitter 113 to the respective ONTs 120 are called drop links 130. In FIG. 1, all branches of the splitter 113 are connected to drop links 130. It shall be noted that it is not compulsory to connect drop links to all branches.

Further, the OTDR device 102 is connected to the switch 112, which is adapted to insert the OTDR signal between the first and the second splitter stage of the splitter 113. By inserting the OTDR signal after the first splitter stage and before the second splitter stage, the attenuation due to the splitter 113 can be reduced, since each splitter stage is associated with a certain attenuation or loss.

OTDR monitoring and supervision is often combined with Optical Transceiver Monitoring, OTM, providing measurable parameters, such as transmit/receive power at the OLT and the ONTs. The parameters are collected from the ONTs by a centralized control unit (not shown), which also controls the OTDR device and the optical switch.

Combined OTDR and OTM techniques enable measurement of various performance related parameters, such as transmit and receive optical power levels, discrete and cumulative losses as well as reflectance. Analysis of those parameters gives a complete picture of any the possible failures that may occur between the OLT and the ONTs.

Figure 1B:
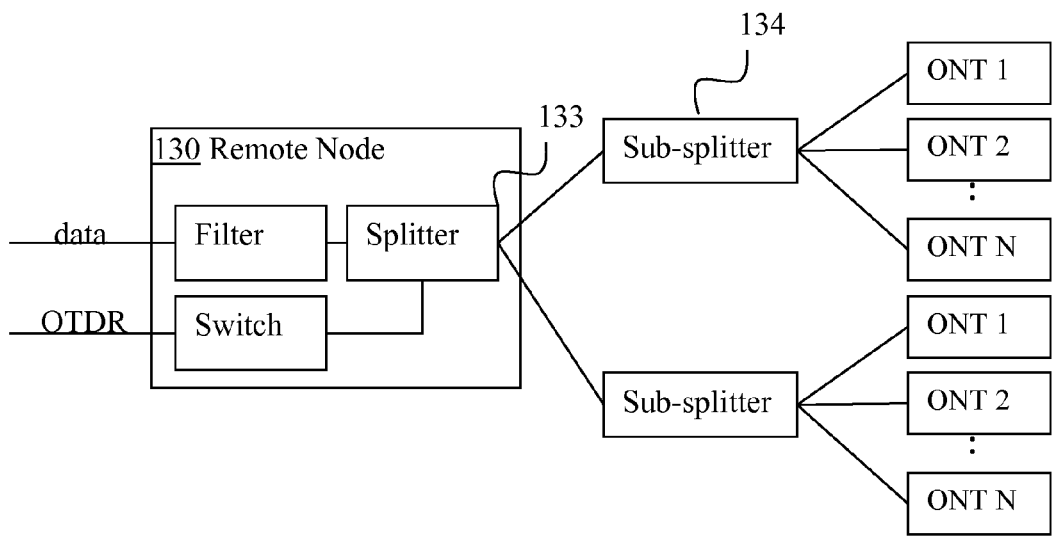
FIG. 1b is a schematic illustration of a PON having sub-splitters arranged in drop links, according to one example embodiment.

With reference to FIG. 1b, a PON having a more complex architecture is described. The PON in 1b comprises a remote node 130 which corresponds to the remote node in FIG. 1a. The remote node 130 comprises a splitter 133, similar to the splitter in FIG. 1a, having one or more drop links connected. However, in this embodiment the drop links comprises one or more sub-splitters 134.

In this description, the term "sub-splitter" shall mean a sub-splitter having one, two or more branches and one input port connected to a fibre being connected to the splitter 113 in the remote node 130. Thus, the sub-splitter is having a splitter ratio which is denoted as ratio 1:$N_{branch}$, where $N_{branch}$ is the number of outgoing ports to which it is possible to connect drop links to the sub-splitter. Thus, in the architecture described with reference to FIG. 1b, the number of possible ONTs connected to the splitter 133 is depending on the number of sub-splitters and the $N_{branch}$ for each sub-splitter.

Having the above described architecture in mind, event detection and calculation of the severity of a fault will now be described. Hereinafter, an event is what is detected by the OTDR measurement and a fault is what is calculated from the event. Performing OTDR measurements and analysis of an architecture described above with reference to FIG. 1a requires advanced analysis and calculation. However, by introducing sub-splitters in the drop links, as illustrated in FIG. 1b, the level of complexity increases.

Now, a typical use of the OTDR measurement function will be described. The last splitter stage is of ratio 2:$N_{root}$, where a first input comes from the previous splitter stage and a second input is a monitoring port. Merely as an example, a multistage splitter has two splitter stages, wherein the first splitter stage is 1:4 and the second splitter stage is 2:8. This results in the splitter having a total ratio of 1:32, wherein the second splitter stage has four monitoring ports.

In case the incoming signal is an OTDR measurement signal, it is inserted into the monitoring port of the last splitter stage. The input OTDR signal propagates from the monitor input port through the splitter and reaches the splitter output port. Further on, the signals propagate along the fiber drop links. Part of each signal is backscattered due to Rayleigh Backscattering phenomena. The power level of the returned signal is proportional to the initial power at the splitter output port P-in/N. The proportionality is driven by the fiber attenuation per km and backscattering coefficient. Next, the signals returned from all splitter output ports travel through the splitter again and a superposition of all of them is sent to the monitor port which now acts as a monitor output port. The total output power at the monitor port is given as $$N * \frac{P-\text{in}}{N^2}.$$

the loss in the splitter detected by the OTDR, is calculated as follows:

$$5 * \log\left(\frac{P-\text{in}}{N * \frac{P-\text{in}}{N^2}}\right) = 5 * \log(N). \quad (1)$$

As can be seen, the OTDR measurement takes into account the double loss that the signal experiences as the signal travels up and down the drop link, through the splitter. Due to this fact, the factor in front of the logarithm is "5" instead of "10".

If all the splitter output ports, also referred to as branches above and below in this description, are connected to drop links, the OTDR will "see" half of the real loss of the splitter, e.g. an ideal 1:8 splitter would appear as 4.5 dB loss instead of 9 dB on the OTDR trace or the backscattered OTDR signal. However, the fewer fiber drop links connected to the splitter output ports, the lower the power backscattered to the OTDR. This means that the measured splitter loss differs in function of the number of connected drop links. If M out of N branches are non-connected, the OTDR-recorded loss in the splitter is $$L_{splitter} = 5 * \log\left(\frac{N^2}{N-M}\right). \quad (2)$$

The loss in the splitter increases as M increases. In case only one drop link is connected to the splitter output port, then M=N−1. Then the measured splitter loss is $$5 * \log\left(\frac{N^2}{1}\right) = 10 * \log(N),$$

which represents the real loss of the splitter.

Based on the above approach, a generic equation to retrieve magnitudes of new events (faults) occurring after the splitter can be formulated.

Figure 2:
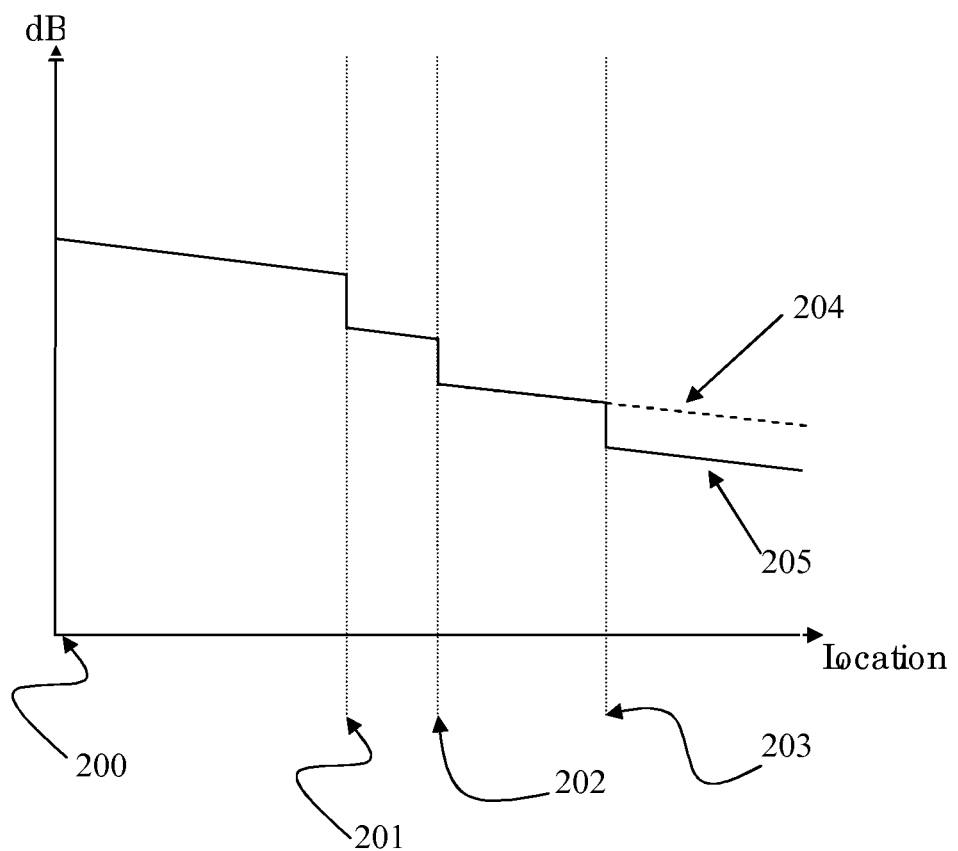
FIG. 2 is a graph illustrating signal attenuation as a function of distance in an OTDR analysis, according to one example embodiment.

With reference to FIG. 2, a simplified illustration of an exemplifying OTDR measurement in the PON of FIG. 1a-b, is described. FIG. 2 illustrates the attenuation along the PON from the OTDR device 102. It shall be pointed out that FIG. 2 is a simplified illustration and any possible attenuation due to the switch is not shown. FIG. 2 illustrates that the OTDR signal is constantly attenuated until it reaches the splitter 113, 133. The splitter 113,133 is associated with certain instant attenuation which is illustrated at with a line 201 in FIG. 2. Thus, the location of the splitter may be determined based on the instant drop which occurs when the OTDR signal enters into the splitter. Then, the OTDR signal is again constantly attenuated as it is ravelling long the drop links towards the ONTs. At the location indicated by line 202, the OTDR signal enters into a sub-splitter and thereafter continues towards the ONTs, indicated by line 204. As an illustrative example, an event has occurred at location 203 which is seen as steep drop in attenuation. The difference between the reference value as indicated by line 204 and the actual read out on line 205 may be used to determine the severity of the event as well as the distance from the OTDR device. However, since the event has occurred after the OTDR signal has reached a sub-splitter, it may be hard to determine which of the drop links that is affected.

Hence, by reading the result from the OTDR measurement illustrated in FIG. 2, it is possible to detect the event at location j, but it is very difficult, if not impossible, to ascertain the severity of the event and to decide whether it is necessary to actually take actions to repair the fibre drop link or take any other actions such as removing the fibre drop link or the sub-splitter. The higher the magnitude of the actual fault detected by the event, the greater the severity of the event at location j.

Therefore, with reference to FIGS. 3 to 6b, a procedure for determining the location and severity of an event, will now be described. The determining of the location and severity is performed in an advanced architecture involving one or more sub-splitters connected in-between an ONT and the splitter in a remote node.

Figure 3:
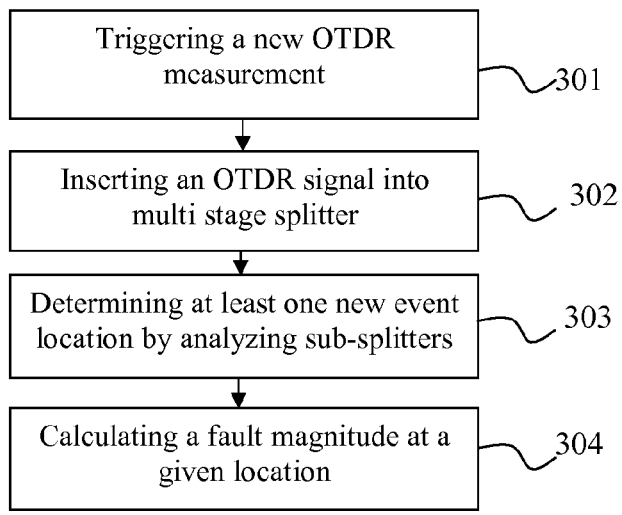
FIG. 3 is a flow chart illustrating the procedure for determination the location and the severity of a fault, according to one example embodiment.
Figure 6:
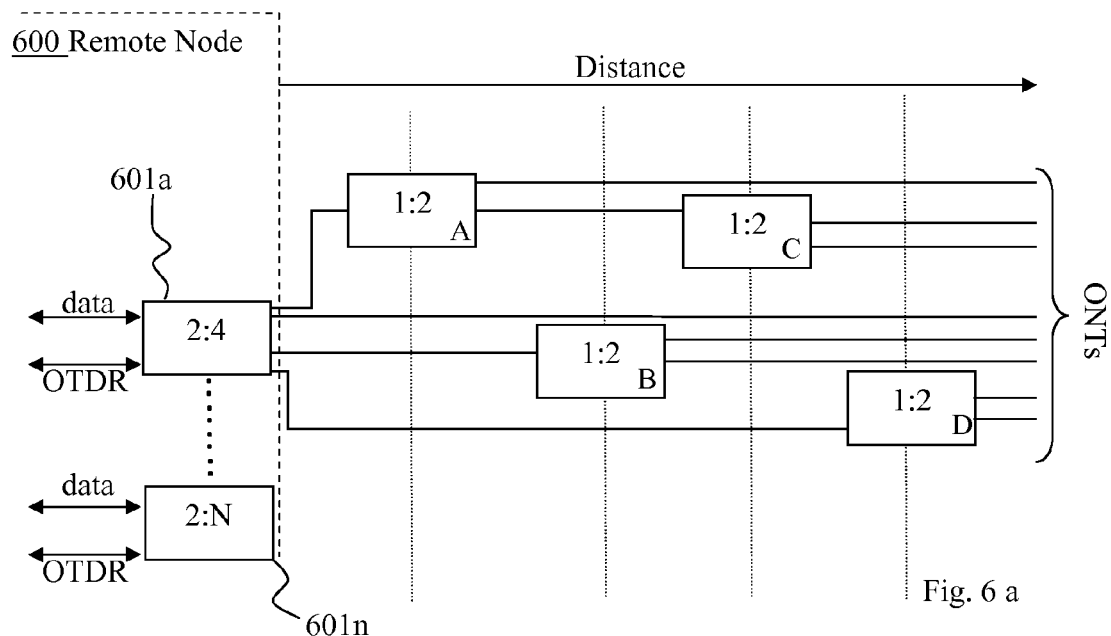
FIG. 6a is a schematic illustration of a PON having sub-splitters arranged in drop links, according to one example embodiment.
FIG. 6b is a schematic illustration of a last splitter stage having sub-splitters arranged in drop links, according to one example embodiment.
Figure 6:
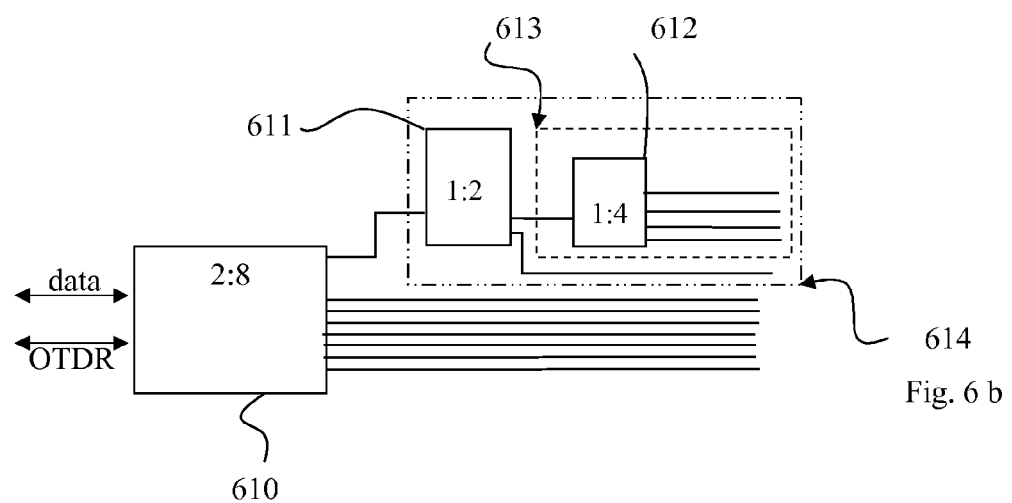

With reference to FIG. 3, a procedure for performing fault analysis in a PON as described above with reference to FIG. 2, will now be described. In a first action 301, a new OTDR measurement is triggered. An OTDR measurement may be triggered based on demand or periodically, either based on status reports from the ONTs or based on instructions from the CO. In any case, in order to perform analysis of the triggered OTDR measurement, a reference measurement is performed prior to the triggering of the OTDR measurement. The reference measurement indicates the attenuation for a certain location when the PON is in its original state.

An OTDR measurement signal is inserted into a multistage splitter, before a last splitter stage, indicated by action 302. The last splitter stage is herein denoted to have a ratio which is of $2:N_{root}$ in contrast to the sub-splitters described above which normally are of an splitter ratio $1:N_{branch}$. The OTDR signal is thus further traveling into one or more drop links being connected to the multistage splitter, also traveling further into the drop links and further split by one or more sub-slitters comprised in the drop links.

Then, one or several event locations are determined based on the OTDR measurement signal. This is done by analyzing OTDR measurement data relating to the sub-splitters in a predefined sequence, as indicated by action 303. According to one example, the sequence is individual for each branch being connected to the last splitter stage, starting based on the drop links for which the upstream optical signal needs to travel through the largest number of sub-splitters in order to reach the last splitter stage. In other words, the predefined sequence is, in this embodiment, based on the number of serially connected sub-splitters between an ONT and said last splitters stage. In one embodiment, the predefined sequence may be determined to start by analyzing OTDR measurement data relating to sub-splitters having drop links being connected to only ONTs and not connected to any further sub-splitter, i.e. the lowest level sub-splitter in a nestled structure.

Then, in a final action 304 a fault magnitude is calculated at a given location by subtracting an event magnitude which is obtained from the new OTDR measurement from the reference OTDR measurement and taking into account the number of drop links connected to the last splitter stage and to the sub-splitter(s) in the reference measurement and the new measurement. Thereby determining the location and the severity of an event in a PON comprising sub-splitters connected to the last-splitter stage of the splitter in the remote node. Possible examples of the actions of the procedure described above will be further elaborated below with together with examples from FIG. 4 and FIG. 5.

According to one possible embodiment, the insertion of an OTDR measurement signal is triggered by receiving a fault alarm or an OTM measurement report from at least one ONT comprised in the PON. In an example, the method further comprises querying the ONTs being connected to the PON about their received optical power periodically.

In this example, by periodically querying the ONTs being comprised in the PON about their received optical power, any change in their received optical power is quickly detected. This enables swift detection of any sudden decrease in received optical power.

The querying comprises sending an information request regarding the received optical power at the ONTs.

In another example, the method further comprises querying the ONTs being connected to the PON about their received optical power on demand.

In this example, resources can be saved by only querying the ONTs on demand. On-demand may be triggered manually or automatically as soon as an alarm is received from an ONT, the alarm indicating low received optical power.

In the procedure described above with reference to FIG. 3, a reference measurement is used in action 301. According to one possible embodiment, a total loss, TLref, in the reference OTDR measurement is represented by:

$$TLref = 5*\log\left(\frac{N^2}{\sum_{n=1}^{N}\Pi_{j=1}^{J}\alpha REF_{n,j}^2 - M_{REF}}\right), \quad (3)$$

The representation above is applicable for representing a reference OTDR measurement "seen" from the last splitter stage or from "seen" from a sub-splitter. In the case of the last splitter stage, N is the number of drop links of the last splitter stage which is denoted as $N_{root}$. However, if the TLref is determined for a sub-splitter, then N is the number of drop links of a sub-splitter, $N_{branch}$. In the equation above, J is the number of events and M is the number of non-connected drop links of the last splitter stage of the multistage splitter. If a TLref is determined for a sub-splitter, then j is the number of non-connected drop links of the sub-splitter. $\alpha_{n,j}$ is a linear factor describing the loss which the signal experiences in the n-th fiber at a j-th location, i.e. at a representation of the distance of the drop link. Thus in the equation above, $\alpha REF_{n,j}$ is representing the reference loss for the n-th fiber at a j-th location.

As mentioned above, in relation to FIG. 1a-b, it is not compulsory to connect drop links to all branches. In other words, the multistage splitter and/or the sub-splitter may be able to support more ONTs than currently being connected thereto. However, the number of non-connected branches will affect the total loss.

Thus, by using the equation (3) above, a reference OTDR measurement may be created. The reference OTDR measurement is normally created when the PON is in a controlled state of normal function. For example during maintenance or during deployment. The structure of the PON, which is subject for the OTDR measurement, is normally known by the maintainer of the PON. Thus, it is generally known which branches that are connected and where a drop link comprises a sub-splitter.

If a new OTDR measurement has been triggered. Then, according to one possible embodiment, a total loss, TLnew, in the new OTDR measurement is represented by:

$$TLnew = 5*\log\left(\frac{N^2}{\sum_{n=1}^{N}\Pi_{j=1}^{J}\alpha NEW_{n,j}^2 - M_{NEW}}\right), \quad (4)$$

Also in the equation above, for determining TLnew, N is the number of drop links of the last splitter stage of the multistage splitter which is denoted as $N_{root}$. However, if the TLnew is determined for a sub-splitter, then N is the number of drop links of a sub-splitter, $N_{branch}$. In the equation above, J is the number of events and M is either the number of non-connected drop links of the last splitter stage of the multistage splitter. If a TLnew is determined for a sub-splitter, then j is the number of non-connected drop links of the sub-splitter.

Again, it is not compulsory to connect drop links to all branches of the last splitter stage or to the sub-splitter. However, the number of non-connected branches will affect the total loss. It can also be seen from the above equations, that the number of non-connected branches in the new OTDR measurement need not be the same as the number of non-connected branches in the reference measurement.

When a reference OTDR measurement, TLref, is compared to a triggered OTDR measurement, TLnew, the difference there between may be calculated. According to yet one possible embodiment, the difference, ΔTL, between the total loss in the reference OTDR measurement and the total loss in the new OTDR measurement is represented by:

$$\Delta TL = \left|5*\log\left(\frac{\sum_{n=1}^{N}\Pi_{j=1}^{J}\alpha NEW_{n,j}^2 - M_{NEW}}{\sum_{n=1}^{N}\Pi_{j=1}^{J}\alpha REF_{n,j}^2 - M_{REF}}\right)\right| \quad (5)$$

From the equation above, it can be seen that the number of non-connected branches in the two OTDR measurements are taken into account when representing the difference in the total loss. ΔTL may be determined for an OTDR measurement "seen" from the sub-splitter or "seen" from the last splitter stage.

Different scenarios may arise, wherein a drop link may be subjected to more than one event and also more than one drop link may be associated with or subjected to one or more events. Some scenarios are more likely than others to occur, but they may still happen. The equations (3), (4) and (5) may also be used in order to analyze nested sub-splitters, i.e. a sub-level in the drop links connected to the last splitter stage.

According to yet an embodiment, an alarm or measurement report is received from one ONT and the number of new event locations is one and no events were detected in the reference measurement, wherein all the branches were connected to the splitter in the OTDR reference measurement and are also connected in the new OTDR measurement. In this embodiment, the procedure may further comprise calculating the magnitude, α, of a fault using:

$$\alpha[dB] = 5*\log\left(1 - N + N*10^{\frac{-|\Delta TL|}{5}}\right) \quad (6)$$

According to an embodiment, wherein an alarm or measurement report is received from one ONT and the number of new event locations is j, j>1, and no events were detected in the reference measurement, the procedure further comprises calculating the magnitude of the fault in the first ONT, α, using:

$$\alpha_j[dB]=5*\log(1-N+N*10^{-|\Delta TL_j|}). \quad (7)$$

In this scenario, a fibre drop link is subjected to more than one fault. Merely as an example, assume the drop link is subjected to two faults. Then, the ONT will experience an attenuation due to both faults which is the multiplication of the two faults. Assume the first fault induces an attenuation of α1 (in linear scale) and the second fault induces an attenuation of α2 (in linear scale). Then the ONT will experience a total attenuation of α1*α2 (in linear scale). The ONT will not have any "knowledge" of the number of faults in the drop link. The number of event locations will be derivable from the back-scattered OTDR measurement signal.

According to yet an embodiment, wherein an alarm or measurement report is received from n number of ONTs, n>1, and the number of new event locations is one and no events were detected in the reference measurement, the procedure further comprises calculating the magnitude of the fault in the first ONT, α, using:

$$\alpha[dB] = 5*\log\left(N*10^{\frac{-|\Delta TL|}{5}} - \sum_{m=2}^{N} \alpha_n^2\right). \quad (8)$$

In this scenario, more than one ONT experiences reduced signal power and issues an alarm. Also in this scenario, it is assumed that there is only one event in each of the drop links experiencing an unexpected or new attenuation.

Figure 4:
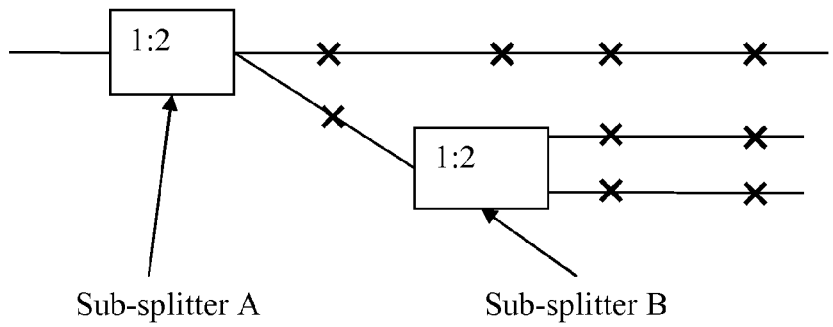
FIG. 4 is a drop link having a first and a second sub-splitter arranged serially, according to one example embodiment.
Figure 5:
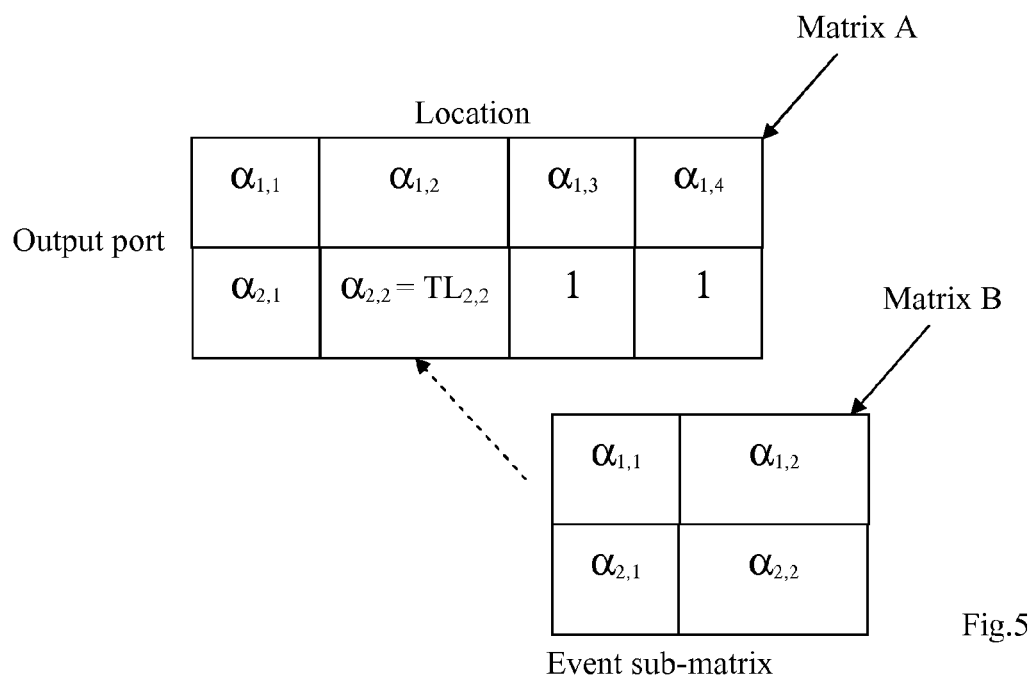
FIG. 5 is a first and a second event matrixes corresponding to the first and the second sub-splitters in FIG. 4, according to one example embodiment.

With reference to FIG. 4 and FIG. 5 will now the procedure above described be exemplified by a simplistic illustration. The FIGS. 4 and 5 should be seen together since FIG. 5 is a matrix representation of possible events in a cascade architecture as described in FIG. 4

FIG. 4, shows a first sub-splitter A having a splitter ratio 1:2. Thus, the sub-splitter A has two drop links, whereas one is connected to a second sub-splitter B which also is of the splitter ratio 1:2. The splitter ratios in this example are set to 1:2, however, any other splitter ratio would be possible, i.e. any splitter ratio 1:$N_{branch}$, where $N_{branch}$>1. With the setup of the architecture as described with reference to FIG. 4, one drop link is spitted into three drop links which may serve three ONTs. For the sake of simplicity and clarity, four possible event locations have been indicated by X at the drop links in FIG. 4.

If an OTDR measurement signal is inserted into the sub-splitter A, then an event matrix could be representing the total loss for the given locations. In FIG. 5, the matrix A represents the event matrix as "seen" from the sub-splitter A. The Sub-splitter A cannot "see" the branches beyond sub-splitter B. Therefore, at the location for the sub-splitter B in the event matrix A, α is replaced with a new representation of the total loss for the branches of sub-splitter B. Locations "behind" the location of sub-splitter B will be filled with the value 1 since the α is a linear factor describing the loss which the signal experiences Thus, in order to calculate $\alpha_{n,j}$ of Matrix A which represents the complete architecture as shown with reference to FIG. 4, the event sub-matrix, matrix B in FIG. 5, is first calculated by for example using any of the equations (3), (4) or (5).

Since FIG. 4 and FIG. 5 are mere examples of how to solve the problem of nested sub-splitters using the procedure described with reference to FIG. 3, this procedure may be applied to any architecture having one or more sub-splitters connected to parallel branches of the last splitter stage or even connected serially as shown in FIG. 4.

Figure 7:
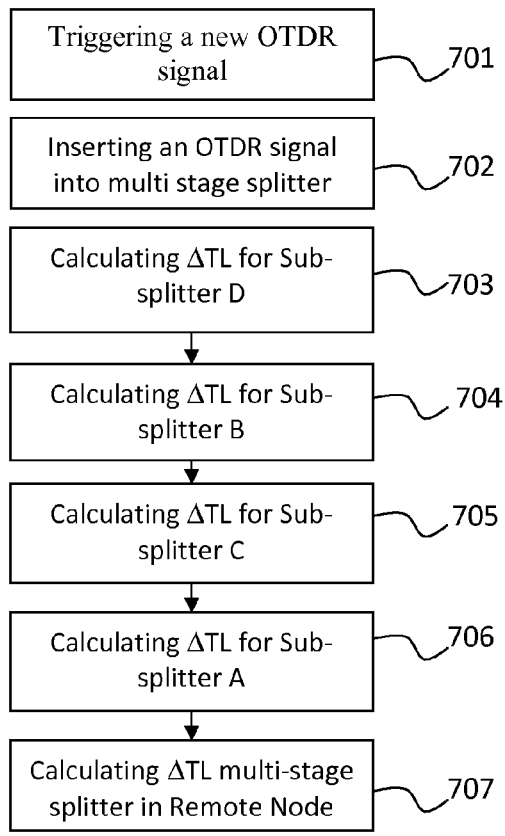
FIG. 7 is a flow chart illustrating the procedure for calculating the Total Loss in an advanced PON structure, according to one example embodiment.

With reference to FIG. 6a-b and FIG. 7, an example embodiment for determining the location and severity of events in a PON will now be described. FIG. 6a shows a remote node 600 comprising a multistage splitter corresponding to the splitter illustrated in FIG. 1 b. The splitter having one or more, whereas the splitter stage 601a in FIG. 6a comprises a last splitters stage with a ratio 2:4. In the architecture of drop links between the OLTs and last splitter stage 601a, a plurality of sub-splitters are deployed. This particular example comprises four sub-splitters referred to in FIG. 6a as sub-splitter A, B, C and D. In this particular example, sub-splitter C is connected to one of the branches of the sub-splitter A. Thus, sub-splitter A and C forms a nested architecture.

FIG. 6b is a block diagram illustrating a yet more simplified example of a last splitter stage 610 having a splitter ratio of 2:8. This example aims to further describe one possible example of the analysis sequence in a nested architecture. The outgoing drop links comprises a first sub-splitter 611 having a second sub-splitter 612 connected to one of its two outgoing branches. Thus, when performing OTDR measurement analysis and calculation, a lowest level "sub-net" 613 is analyzed by for instance using equations (3), (4) and (5). Thereafter is a second lowest level "sub-net" 614 is analyzed, taking into account the results from the lowest level sub-net 613. Thereafter, an analysis and calculation may be done for all branches of connected to the last splitter stage 610.

With the procedure and the possible embodiments described with reference to FIGS. 3 to 5, a procedure for performing and OTDR measurement and analysis in the exemplifying PON arrangement of FIG. 6a, is described with reference to FIG. 7.

In a first action 701, a new OTDR measurement signal triggered and thereafter inserted into the multistage splitter, as indicated in action 702. Then, when receiving the backscattered light from the OTDR measurement, the sub-splitter, having the largest number of sub-splitters serially connected when travelling back to the last splitters stage, and its branches is analyzed and calculated, i.e. ΔTL is calculated, gradually followed by the next sub-splitter having the second most sub-splitters connected in serial between next sub-splitter and the last splitter stage. Thus, in action 703, the OTDR measurement is calculated to determine any events at the branches of sub-splitter D. Thereafter, the same procedure is performed for sub-splitter B indicated by action 704. Then, in order to determine ΔTL for locations and events in the branch from the last splitter stage to the sub-splitter A the lowest level sub-splitter is analyzed, which in this case is sub-splitter C, which is indicated by action 705. Thus, the branches of sub-splitter C are calculated and the result from sub-splitter C is then taken into the calculation and determination of events of sub-splitter A, as indicated by action 706. Hence, a determination of ΔTL for the all the branches of the last splitter stage is possible by gradually solving each sub-splitter by for example using the equations (3), (4) and (5).

Figure 8:
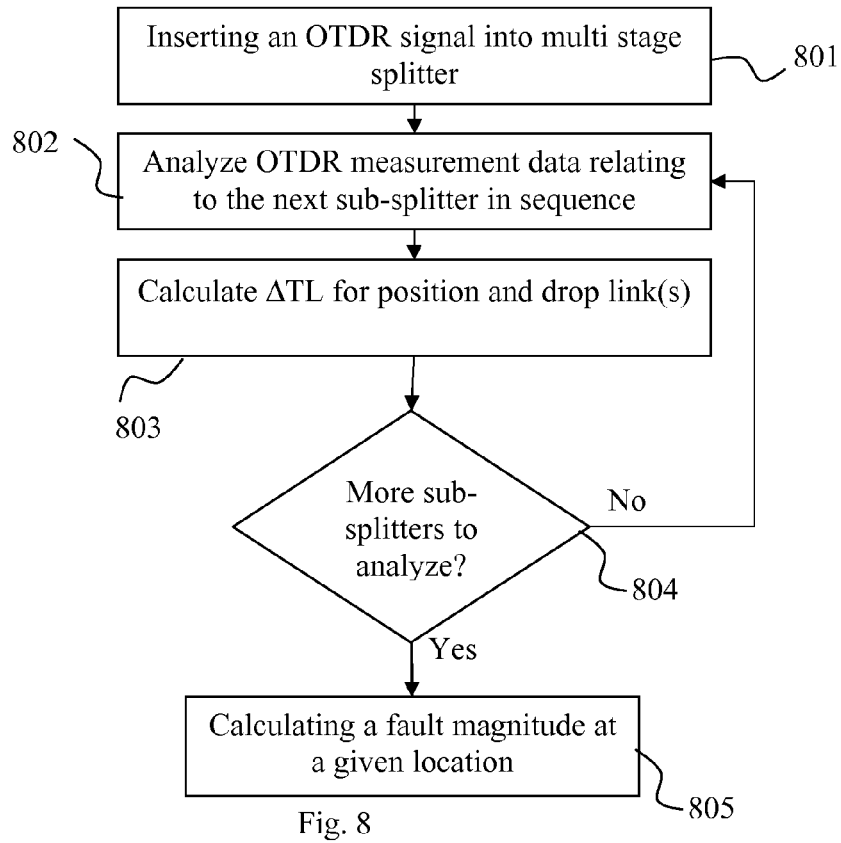
FIG. 8 is a flow chart illustrating the procedure for determining the location and severity of a fault, according to one example embodiment.

With reference to FIG. 8, a procedure for determining fault magnitudes at a given location in a drop link comprising one or more sub-splitters will now be described. In a first action, the OTDR measurement is inserted into the multistage splitter in action 801. Then, for the drop link in question, for which the structure and connected sub-splitters is know, the sub-splitter's blocks are analyzed in a preset sequence indicated by action 802. In action 803, the OTDR measurement is calculated with respect to ΔTL for the connected drop links of the sub-splitter.

If the sequence of sub-splitters still comprises sub-splitters to be analyzed, the action 802 and 803 is repeated, as indicated in action 804. Then in a final action 805, fault magnitudes are determined for given locations based on the analysed backscattered OTDR measurement signal from the sub-splitters and drop links.

With reference of FIG. 9, a generic event matrix is described. Each row of the event matrix corresponds to a single fibre drop link. The total loss seen by the ONT or receiver at the end of a given link, n, is $$\alpha_{n,1}*\alpha_{n,2}*\ldots*\alpha_{n,J} = \Pi_{j=1}^{J}\alpha_{n,j}.$$

As described above, the ONT will only "see" or experience the total loss in the fibre drop link. The ONT cannot determine the magnitude and distance of each event on the fibre drop link, in relation to splitter, sub-splitters and the ONT, of each event. This is referred to as horizontal overlap.

Each column of the event matrix in FIG. 9 corresponds to a single location as indicated on the OTDR trace. The total loss as "seen" by the OTDR for a given event location, j, in the trace is $$\alpha_{1,j} + \alpha_{2,j} + \ldots + \alpha_{N,j} = \Sigma_{n=1}^{N} \alpha_{n,j}.$$

Since the OTDR will only "see" the total step for all events placed at the same distance on each branch, it cannot determine the magnitude and branch for each separate event. This is referred to as vertical overlap of events.

As described above with reference to FIG. 4-6b, each $\alpha_{n,j}$ may be replaced with the total loss for a sub-splitter and its branches. Hence, an OTDR analysis is possible for any combination of sub-splitter stage having a 2:$N_{root}$ splitter ratio and one or more sub-splitters comprised in the drop links.

FIG. 10, is a block diagram of an exemplifying client unit 1001 which may be arranged in a Fibre Plant Manager. The client unit 1001 is adapted to perform fault analysis in a PON by using OTDR. The client unit has the same objects and advantages as the procedures described above and will only be discussed in brief, for simplicity reasons.

FIG. 10 illustrates the client unit 1001 comprising an interface unit 1002 and a processing unit 1003. The processing unit 1003 is adapted to trigger a new OTDR measurement, wherein a previous reference measurement has been made indicating an original state of the PON. The processing unit 1003 is further adapted to insert an OTDR measurement signal into a multistage splitter (not shown) before a last splitter stage of the multistage splitter, via the interface unit 1003. The last splitter stage is of ratio 2:$N_{root}$. A drop link being connected to the multistage splitter comprises one or more sub-splitter(s). The sub-splitter(s) is of a ratio 1:$N_{branch}$.

The processing unit 1003 is further adapted to determine one or more new event location(s) based on the OTDR measurement signal by analyzing OTDR measurement data relating to the sub-splitter(s) connected to the last splitter stage in a predefined sequence.

The processing unit 1003 is further adapted to calculate a fault magnitude at a given location by subtracting an event magnitude obtained from the new OTDR measurement from the reference OTDR measurement and taking into account the number of drop links connected to the last splitter stage and to the sub-splitter(s) in the reference measurement and the new measurement, thereby enabling determination of position and severity of the fault locations.

According to an embodiment, the interface unit 1002 is adapted to receive a fault alarm or an Optical Transceiver Monitoring, OTM, measurement report from at least one Optical Network Terminal, ONT, connected to the PON, wherein the processing unit is triggered to insert the OTDR measurement signal into the multistage splitter before the last splitter stage of the multistage splitter.

In an embodiment, the processing unit 1003 is further adapted to periodically query the ONTs being connected to the PON about their received optical power.

In another embodiment, the processing unit 1003 is further adapted to query the ONTs being connected to the PON about their received optical power on-demand.

According to yet an embodiment, the processing unit 1003 is adapted to represent a total loss, TLref, in the reference OTDR measurement by:

$$TLref = 5 * \log\left(\frac{N^2}{\sum_{n=1}^{N}\prod_{j=1}^{J} \alpha REF_{n,j}^2 - M_{REF}}\right), \qquad (3)$$

In the case of the last splitter stage, N is the number of drop links of the last splitter stage which is denoted as $N_{root}$. However, if the TLref is determined for a sub-splitter, then N is the number of drop links of a sub-splitter, $N_{branch}$. In the equation above, J is the number of events and M is either the number of non-connected drop links of the last splitter stage of the multistage splitter. If a TLref is determined for a sub-splitter, then j is the number of non-connected drop links of the sub-splitter. $\alpha_{n,j}$ is a linear factor describing the loss which the signal experiences in the n-th fiber at a j-th location, i.e. at a representation of the distance of the drop link. Thus in the equation above, $\alpha REF_{n,j}$ is the representing the reference loss for the n-th fiber at a j-th location.

In still an embodiment, the processing unit 1003 is adapted to represent a total loss, TLnew, in the new OTDR measurement by:

$$TLnew = 5 * \log\left(\frac{N^2}{\sum_{n=1}^{N}\prod_{j=1}^{J} \alpha NEW_{n,j}^2 - M_{NEW}}\right), \qquad (4)$$

The variables N, M and J are having the same properties as described above with reference to equation (3).

According to an embodiment, the processing unit 1003 is adapted to represent the difference, $\Delta TL$, between the total loss in the reference OTDR measurement and the total loss in the new OTDR measurement, $\Delta TL$, by:

$$\Delta TL = \left|5 * \log\left(\frac{\sum_{n=1}^{N}\prod_{j=1}^{J} \alpha NEW_{n,j}^2 - M_{NEW}}{\sum_{n=1}^{N}\prod_{j=1}^{J} \alpha REF_{n,j}^2 - M_{REF}}\right)\right|. \qquad (5)$$

The variables N, M and J are having the same properties as described above with reference to equation (3) and (4).

According to yet an embodiment, an alarm or measurement report is received by the interface unit 1002 from one ONT and the number of new event locations is one and no events were detected in the reference measurement, wherein all the branches were connected to the splitter in the OTDR reference measurement and are also connected in the new OTDR measurement. In this embodiment, the processing unit may be further adapted to calculate the magnitude, $\alpha$, of a fault using:

$$\alpha[dB] = 5 * \log\left(1 - N + N * 10^{\frac{-|\Delta TL|}{5}}\right) \qquad (6)$$

According to an embodiment, wherein an alarm or measurement report is received by the interface unit 1002 from one ONT and the number of new event locations is j, j>1, and no events were detected in the reference measurement, the processing unit may be further adapted to calculate the magnitude of the fault in the first ONT, $\alpha$, using:

$$\alpha_j[dB] = 5 * \log(1 - N + N * 10^{-|\Delta TL_j|}). \qquad (7)$$

According to yet an embodiment, wherein an alarm or measurement report is received from n number of ONTs, n>1, and the number of new event locations is one and no events were detected in the reference measurement, the processing unit may be further adapted to calculate the magnitude of the fault in the first ONT, α, using:

$$\alpha[dB] = 5 * \log\left(N * 10^{\frac{-|\Delta TL|}{5}} - \sum_{m=2}^{N} \alpha_n^2\right). \quad (8)$$

In this scenario, more than one ONT experiences reduced signal power and issues an alarm. Also in this scenario, it is assumed that there is only one event in each of the drop links experiencing an unexpected or new attenuation.

FIG. 11 schematically shows an embodiment of an arrangement 1100 in a client unit, which also can be an alternative way of disclosing an embodiment of the arrangement for perform fault analysis in a PON by using OTDR measurement, as illustrated in FIG. 10 and described above. Comprised in the arrangement 1100 are here a processing unit 1106, e.g. with a DSP (Digital Signal Processor), a triggering module 1110a, an inserting module 1110b, a determining module 1110c and a calculation module 1110d. The processing unit 1106 can be a single unit or a plurality of units to perform different actions of procedures described herein. The arrangement 1100 may also comprise an input unit 1102 for receiving signals and information from other entities such as OLTs, and an output unit 1104 for providing signals, requests and responses or other type of information to entities such as OLTs. The input unit 1102 and the output unit 1104 may be arranged as an integrated entity.

Furthermore, the arrangement 1100 comprises at least one computer program product 1108 in the form of a non-volatile memory, e.g. an EEPROM (Electrically Erasable Programmable Read-Only Memory), a flash memory and a disk drive. The computer program product 1108 comprises a computer program 1110, which comprises code means, which when run in the processing unit 1106 in the arrangement 1100 causes the arrangement to perform the actions of the procedures described earlier in conjunction with FIG. 3 to FIG. 8.

The computer program 1110 may be configured as a computer program code structured in computer program modules. Hence in the example embodiments described, the code means in the computer program 1110 of the arrangement 1100 comprises a receiving module 1110a for receiving a request from an AS. The computer program further comprises a determining module 1110b for determining, based on an indicator, to which target domain the request shall be dispatched. The computer program 1110 further comprises a dispatching module 1110c for dispatching the request to a subscription server in the target network domain. The request may be provided to the target domain using the output unit 1104.

The modules 1110a-d could essentially perform the actions of the flow illustrated in FIG. 3, to emulate the arrangement in a domain resolution function illustrated in FIG. 10. In other words, when the different modules 1110a-d are run on the processing unit 1003, they correspond to the units 1001-1003 of FIG. 10.

Similarly, a corresponding alternative to perform the actions of the flow illustrated in FIG. 3 is possible by adding additional computer program modules.

Although the code means in the embodiment disclosed above in conjunction with FIG. 11 are implemented as computer program modules which when run on the processing unit causes the arrangement and/or the client unit 1001 to perform the actions described above in the conjunction with FIGS. 3-8 mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product comprises a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the client unit.

Figure 12:
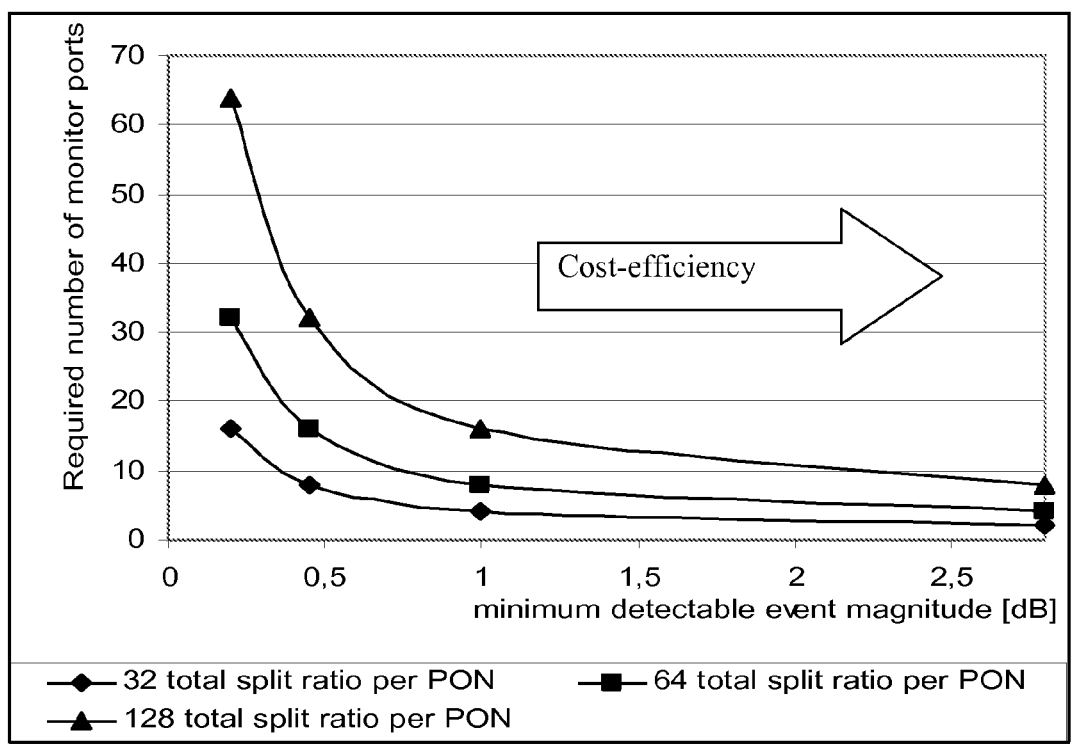
FIG. 12 is a graph illustrating the cost efficiency mechanism in the relationship between the required number of monitor ports and the minimum detectable event magnitude, according to one example embodiment.

With reference to FIG. 12, some general relationships in OTDR analysis will be described. In a scenario in which a single event occurs in one location in one fibre drop link, events of 1 dB can be detected in fibre drop links, which result in around 0.1 dB step on the OTDR measurement after a 2:8 splitter, i.e. the last splitter stage in a multistage splitter. For other sizes of sub-splitters the minimum detectable event is depicted in FIG. 12.

FIG. 12 illustrates the required number of monitor ports as a function of minimum detectable event magnitudes for different total split ratios per PON. The required number of monitor ports is based on equation (1) above.

The required number of monitor ports as a function of minimum detectable event magnitudes is a trade-off between the sensitivity of the fault-detection system and its cost-efficiency. The higher the fault-detection threshold, the higher the number of fibre drop ports supported by a single monitor port.

By using the procedures and arrangement described above, a low cost yet efficient monitoring of the status of the PON may be achieved. While the invention has been described with reference to specific exemplary embodiments, the description is generally only intended to illustrate the inventive concept and should not be taken as limiting the scope of the invention. The invention is defined by the appended claims.

The invention claimed is:

1. A method of performing fault analysis, performed by an arrangement in a Passive Optical Network (PON), comprising at least one Optical Network Terminal (ONT), by using Optical Time Domain Reflectometry (OTDR), said method comprising:

triggering a new OTDR measurement, wherein a previous reference measurement has been made indicating an original state of said PON;

inserting an OTDR measurement signal into a multistage splitter before a last splitter stage of said multistage splitter, and wherein said last splitter stage is of ratio 2:Nroot, so that the last splitter stage is connected to a plurality of drop links, and wherein at least one of the plurality of drop links being connected to said multistage splitter comprises at least one sub-splitter, wherein said at least one sub-splitter is of a ratio 1:$N_{branch}$ so that the at least one sub-splitter has one or more branches and one input port connected to the multistage splitter;

determining at least one new event location based on the OTDR measurement signal by analyzing OTDR measurement data, in a predefined sequence, relating to said at least one sub-splitter connected to said last splitter stage starting based on the drop links for which an upstream optical signal needs to travel through the largest number of sub-splitters in order to reach the last splitter stage; and calculating a fault magnitude at a given location by subtracting an event magnitude obtained from the new OTDR measurement from said reference OTDR measurement and taking into account the number of drop links connected to the last splitter stage and to the at least one sub-splitter in the reference measurement and the new measurement, thereby enabling determination of position and severity of said fault locations.

2. A method according to claim 1, wherein said OTDR measurement data relates to a fibre link connecting a first sub-splitter to one of: an ONT or a second sub-splitter.

3. A method according to claim 2, wherein said predefined sequence is based on the number of serially connected sub-splitters between an ONT and said last splitters stage.

4. A method according to claim 3, wherein said predefined sequence is determined to start by analyzing OTDR measurement data relating to a sub-splitter having drop links being connected to ONTs only.

5. A method according to claim 1, wherein the new OTDR measurement is triggered by the reception of a fault alarm or an Optical Transceiver Monitoring (OTM), measurement report from at least one ONT connected to said PON.

6. A method according to claim 1, further comprising querying the ONTs being connected to said PON about their received optical power periodically.

7. A method according to claim 1, further comprising querying the ONTs being connected to said PON about their received optical power on-demand.

8. A method according to claim 1, wherein a total loss (TLref), in said reference OTDR measurement for a sub-splitter is represented by:

$$TLref = 5 * \log\left(\frac{N^2}{\sum_{n=1}^{N} \prod_{j=1}^{J} \alpha REF_{n,j}^2 - M_{REF}}\right),$$

wherein N is the number of drop links of the last splitter stage of said multistage splitter ($N_{root}$), or where N is the number of drop links of a sub-splitter ($N_{branch}$), J is the number of events and M is either the number of non-connected drop links of said last splitter stage of said multistage splitter, or the number of non-connected drop links of said sub-splitter.

9. A method according to claim 8, wherein the difference, ΔTL, between said total loss in said reference OTDR measurement and said total loss in said new OTDR measurement is represented by $$\Delta TL = \left|5 * \log\left(\frac{\sum_{n=1}^{N} \prod_{j=1}^{J} \alpha NEW_{n,j}^2 - M_{NEW}}{\sum_{n=1}^{N} \prod_{j=1}^{J} \alpha REF_{n,j}^2 - M_{REF}}\right)\right|.$$

10. A method according to claim 8, wherein a is calculated for a first sub-splitter having a splitter ratio 1:N, where in at least one second sub-splitter is connected to the branch of said first sub-splitter, and wherein a first matrix corresponding to the first sub-splitter is calculated having $\alpha_{n,j}$ where j is a location and n a branch of said first sub-splitter, and wherein said location for said second sub-splitter is replaced with an α which is calculated in a second matrix corresponding to the branches of said second sub-splitter.

11. A method according to claim 1, wherein a total loss (TLnew), in said new OTDR measurement is represented by $$TLnew = 5 * \log\left(\frac{N^2}{\sum_{n=1}^{N} \prod_{j=1}^{J} \alpha NEW_{n,j}^2 - M_{NEW}}\right),$$

wherein N is the number of drop links of the last splitter stage of said multistage splitter ($N_{root}$), or where N is the number of drop links of a sub-splitter ($N_{branch}$), J is the number of events and M is the number of non-connected drop links of said last splitter stage of said multistage splitter, or the number of non-connected drop links of said sub-splitter.

12. A method according to claim 1, wherein said alarm is received from one ONT and the number of new event locations is one and no events were detected in the reference measurement, wherein all the drop links were connected to said splitter in said OTDR reference measurement and are connected in the new OTDR measurement, further comprising calculating the magnitude of the fault, α, using $$\alpha[dB] = 5 * \log\left(1 - N + N * 10^{\frac{-|\Delta TL|}{5}}\right).$$

13. A method according to claim 1, wherein said alarm is received from one ONT and the number of new event locations is j, j>1, and no events were detected in the reference measurement, further comprising calculating the magnitude of the fault in the first ONT, α, using, $$\alpha_j[dB]=5*\log(1-N+N*10^{-|\Delta TL_j|}).$$

14. A method according to claim 1, wherein said alarm is received from n number of ONTs, n>1, and the number of new event locations is one and no events were detected in the reference measurement, further comprising calculating the magnitude of the fault in the first ONT, α, using $$\alpha[dB] = 5 * \log\left(N * 10^{\frac{-|\Delta TL|}{5}} - \sum_{m=2}^{N} \alpha_n^2\right).$$

15. A client unit adapted to perform fault analysis in a Passive Optical Network (PON), by using Optical Time Domain Reflectometry (OTDR), comprising:
an interface unit, and
a processing unit adapted to:
trigger a new OTDR measurement, wherein a previous reference measurement has been made indicating an original state of said PON;
insert an OTDR measurement signal into a multistage splitter before a last splitter stage of said multistage splitter, and wherein a last splitter stage is of ratio 2:$N_{root}$, so that the last splitter stage is connected to a plurality of drop links, and wherein at least one of the plurality of drop links being connected to said multistage splitter comprises at least one sub-splitter, wherein said at least one sub-splitter is of a ratio 1:$N_{branch}$, so that the at least one sub-splitter has one or more branches and one input port connected to the multistage splitter, and via said interface unit;

determine at least one new event location based on the OTDR measurement signal by analyzing OTDR measurement data, in a predefined sequence, relating to the at least one sub-splitter connected to said last splitter stage, starting based on the drop links for which an upstream optical signal needs to travel through the largest number of sub-splitters in order to reach the last splitter stage; and calculate a fault magnitude at a given location by subtracting an event magnitude obtained from the new OTDR measurement from said reference OTDR measurement and taking into account the number of drop links connected to the last splitter stage and to the at least one sub-splitter in the reference measurement and the new measurement, thereby enabling determination of position and severity of said fault locations.

16. A client unit according to claim 15, wherein the OTDR measurement data relates to a fibre link arranged to connect a first sub-splitter to one of: an ONT and a second sub-splitter.

17. A client unit according to claim 16, wherein said predefined sequence is based on the number of serially connected sub-splitters between an ONT and said last splitter stage.

18. A client unit according to claim 17, wherein said predefined sequence is determined to start by analyzing OTDR measurement data relating to a sub-splitter having drop links being connected to ONTs only.

19. A client unit according to claim 15, wherein said processing unit is further adapted to periodically query the ONTs being connected to said PON about their received optical power.

20. A method according to claim 19, wherein a is calculated for a first sub-splitter having a splitter ratio 1:N, wherein at least one second sub-splitter is connected to the branch of said first sub-splitter, and wherein a first matrix corresponding to the first sub-splitter is calculated having $\alpha_{n,j}$ where j is a location and n a branch of said first sub-splitter, and wherein said location for said second sub-splitter is replaced with an α which is calculated in a second matrix corresponding to the branches of said second sub-splitter.

21. A client unit according to claim 15, wherein said processing unit is further adapted to query the ONTs being connected to said PON about their received optical power on-demand.

22. A client unit according to claim 15, wherein said processing unit is adapted to represent a total loss (TLref), in said reference OTDR measurement by $$TLref = 5*\log\left(\frac{N^2}{\sum_{n=1}^{N}\prod_{j=1}^{J}\alpha REF_{n,j}^2 - M_{REF}}\right),$$

where N is the number of drop links of the last splitter stage of said multistage splitter ($N_{root}$), or where N is the number of drop links of a sub-splitter ($N_{branch}$), J is the number of events and M is either the number of non-connected drop links of said last splitter stage of said multistage splitter, or the number of non-connected drop links of said sub-splitter.

23. A client unit according to claim 15, wherein said processing unit is adapted to represent a total loss (TLnew), in said new OTDR measurement by $$TLnew = 5*\log\left(\frac{N^2}{\sum_{n=1}^{N}\prod_{j=1}^{J}\alpha NEW_{n,j}^2 - M_{NEW}}\right),$$

where N is the number of drop links of the last splitter stage of said multistage splitter ($N_{root}$), or where N is the number of drop links of a sub-splitter ($N_{branch}$), J is the number of events and M is either the number of non-connected drop links of said last splitter stage of said multistage splitter, or the number of non-connected drop links of said sub-splitter.

24. A client unit according to claim 23, wherein said processing unit is adapted to represent the difference, ΔTL, between said total loss in said reference OTDR measurement and said total loss in said new OTDR measurement, ΔTL, by $$\Delta TL = \left|5*\log\left(\frac{\sum_{n=1}^{N}\prod_{j=1}^{J}\alpha NEW_{n,j}^2 - M_{NEW}}{\sum_{n=1}^{N}\prod_{j=1}^{J}\alpha REF_{n,j}^2 - M_{REF}}\right)\right|.$$

25. A client unit according to claim 15, wherein said alarm is received from one ONT and the number of new event locations is one and no events were detected in the reference measurement, wherein all the branches were connected to said splitter in said OTDR reference measurement and are connected in the new OTDR measurement, wherein said processing unit is adapted to calculate the magnitude of the fault, α, using $$\alpha[dB] = 5*\log\left(1 - N + N*10^{\frac{-|\Delta TL|}{5}}\right).$$

26. A client unit according to claim 15, wherein said alarm is received from one ONT and the number of new event locations is j, j>1, and no events were detected in the reference measurement, wherein said processing unit is adapted to calculate the magnitude of the fault in the first ONT, α, using, $$\alpha_j[dB]=5*\log(1-N+N*10^{-|\Delta TL_j|}).$$

27. A client unit according to claim 15, wherein said alarm is received from n number of ONTs, n>1, and the number of new event locations is one and no events were detected in the reference measurement, wherein said processing unit is adapted to calculate the magnitude of the fault in the first ONT, α, using $$\alpha[dB] = 5*\log\left(N*10^{\frac{-|\Delta TL|}{5}} - \sum_{m=2}^{N}\alpha_n^2\right).$$

28. A non-transitory computer readable storage medium having stored therein a computer program comprising computer readable means, which when run in one or more processing units, causes the one or more processing units to perform a method of performing fault analysis in an arrangement in a Passive Optical Network (PON), comprising at least one Optical Network Terminal (ONT), by using Optical Time Domain Reflectometry (OTDR), said method comprising:

triggering a new OTDR measurement, wherein a previous reference measurement has been made indicating an original state of said PON;

inserting an OTDR measurement signal into a multistage splitter before a last splitter stage of said multistage splitter, and wherein said last splitter stage is of ratio $2:N_{root}$, so that the last splitter stage is connected to a plurality of drop links, and wherein at least one of the plurality of drop links being connected to said multistage splitter comprises at least one sub-splitter, wherein said at least one sub-splitter is of a ratio $1:N_{branch}$ so that the at least one sub-splitter has one or more branches and one input port connected to the multistage splitter;

determining at least one new event location based on the OTDR measurement signal by analyzing OTDR measurement data, in a predefined sequence, relating to said at least one sub-splitter connected to said last splitter stage starting based on the drop links for which an upstream optical signal needs to travel through the largest number of sub-splitters in order to reach the last splitter stage; and calculating a fault magnitude at a given location by subtracting an event magnitude obtained from the new OTDR measurement from said reference OTDR measurement and taking into account the number of drop links connected to the last splitter stage and to the at least one sub-splitter in the reference measurement and the new measurement, thereby enabling determination of position and severity of said fault locations.

* * * * *